United States Patent [19]

Rowell et al.

[11] 3,985,921

[45] Oct. 12, 1976

[54] TREATMENT OF WOOD WITH BUTYLENE OXIDE

[75] Inventors: Roger M. Rowell; David I. Gutzmer, both of Madison, Wis.

[73] Assignee: The United States of America as represented by the Secretary of Agriculture, Washington, D.C.

[22] Filed: June 18, 1975

[21] Appl. No.: 587,923

[52] U.S. Cl. .............................. 427/317; 427/370; 427/393; 427/397
[51] Int. Cl.² ...................... B05D 3/02; B05D 3/12
[58] Field of Search .................. 21/7; 427/317, 370, 427/393, 397, 254

[56] References Cited
UNITED STATES PATENTS
3,183,114  5/1965  Liu et al. .......................... 428/541

Primary Examiner—Michael R. Lusignan
Attorney, Agent, or Firm—M. Howard Silverstein; David G. McConnell

[57] ABSTRACT

The reaction of cellulosic materials with butylene oxide under mildly alkaline conditions to increase resistance to fungi while improving dimensional stability. Wood is first dried and then submerged in a treating chamber containing a solution of butylene oxide and triethylamine. The chamber is heated and subjected to pressure, after which time the solution is drained and vacuum is applied to remove remaining excess reagent.

10 Claims, 1 Drawing Figure

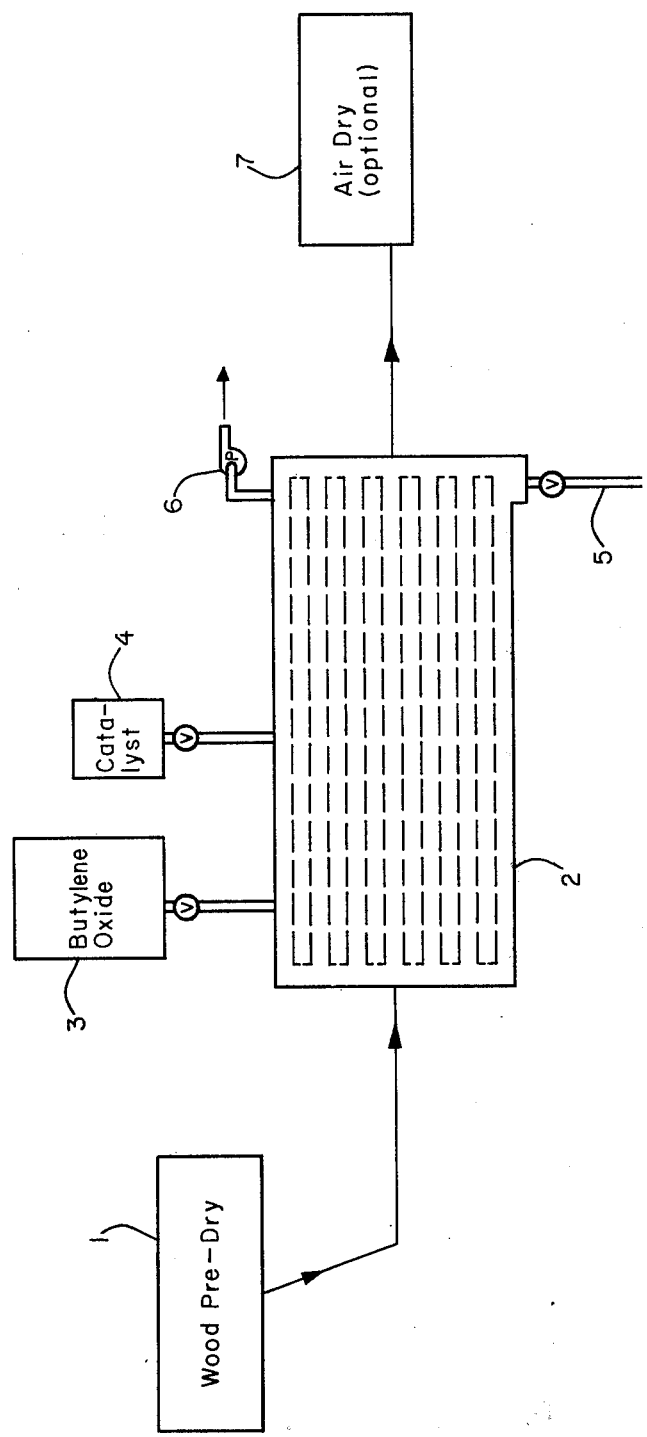

TREATMENT OF WOOD WITH BUTYLENE OXIDE

BACKGROUND OF THE INVENTION

1. Field of the Invention

This invention relates to the chemical treatment of cellulosic materials. More particularly, the invention relates to the treatment of wood and its derivative materials to obtain increased resistance to rot while improving dimensional stability.

2. Description of the Prior Art

Although wood possesses many unique and desirable properties, serious problems have resulted from the fact that cellulosic materials retain water in the fiber molecules; in the fine capillary structure within the fiber wall; and mechanically in the coarse capillary structure between the fibers and within the cell lumen or fiber cavity. Decay organisms proliferate in this environment and often cause rapid deterioration of the cellulosic material. It has been found that by changing the hydrophilic nature of wood through chemical modification the substrate or wood cellulose is rendered unrecognizable as a food source to support microbial growth. In drying the substrate below the fiber-saturation point, however, the bound water held intimately between the fine structural units, of which cellulosic materials are composed, is removed and these structural units are drawn closer together to occupy or eliminate the void area produced by the removal of this water. Upon return of this moisture to the cell walls the wood swells and returns to its original state.

In developing a treatment which will render the cellulosic material resistant to rot while at the same time maintaining or even increasing its dimensional stability, several criteria must be met. In whole wood, accessibility of the treating reagent to the reactive chemical sites is a major consideration. It is advantageous, therefore, that the reagents used for the chemical modification of wood be volatile for good penetration and for ease of removal after reaction. The reagent should react quickly with the wood component hydroxyl groups at low temperatures under mild conditions. There should be 100 percent carbon skeleton add-on of chemical so that no byproducts need be removed. The chemical bonds formed should be stable to ensure permanence. For dry wood, a solvent (which may be the reagent itself), preferably will be used to swell the wood structure and thus facilitate penetration of the cell wall by the reagent. The treated wood should still possess the desirable properties of untreated wood, with the only properties modified being decay resistance and dimensional stability.

Although several methods of chemically treating wood designed for stabilizing the dimensions of wood and other cellulosic materials have been suggested, most have failed in achieving any real commercial significance. In general, the prior art methods suffer from one or more of the following disadvantages: the process is too cumbersome or time consuming; the process is excessively expensive; the process is substantially ineffective under a wide range of exposure or the treatment imports undesirable properties to the product.

It is previously known (U.S. Pat. No. 3,183,114) that by impregnating wood with either ethylene oxide or propylene oxide, that the rot resistance of cellulosic materials may be increased while also increasing the anti-shrink efficiency. The present invention is a process which allows much less expensive treatment than is characteristic of ethylene oxide treatment and is considerably more effective than using propylene oxide. Ethylene oxide has a boiling point of 10° C. so is in a gaseous state at atmospheric pressure. This treatment therefore necessitates the use of cumbersome and expensive pressure vessels, piping and auxiliaries. Butylene oxide, with a boiling point of 63° C., is a liquid at room temperature and pressure and so requires none of this equipment. It may be used to treat a cellulosic sample either in this state or in a gaseous form at elevated temperatures.

Propylene oxide has a boiling point of 35° C. and is therefore a liquid at room conditions. It has been found, however, that a butylene oxide treatment is superior to that using propylene oxide in both anti-shrink efficiency and rot resistance. Tables 1 and 2 show the superior ASE and superior rot resistance can be illustrated by the following example: samples soaked to a weight percent add-on of 7 percent butylene oxide were innoculated with the fungus *Lenzites trabea* and later weighed to determine the weight loss due to deterioration. After 6 weeks the loss was 5.2 percent and after 12 weeks 18.8 percent. When treated with as much as 50 percent weight add-on propylene oxide, the loss was still greater than that treated with 7 percent butylene oxide (6.5 and 25.2 percent respectively).

The present invention is believed to have several advantages over the prior art in treating wood or its derivative material:

1. Eliminates the need for expensive sealed containers, piping and auxiliaries which are necessary with treating chemicals which are normally in a gaseous form.
2. Allows for treatment either in a liquid or a gas phase without excessive temperatures or pressures.
3. The process offers considerably greater range of chemical modification at lower treatment concentrations.

SUMMARY OF THE INVENTION

The substance of this invention is the reaction of cellulosic materials with butylene oxide under mildly alkaline conditions to increase resistance to wood-destroying fungi while improving dimensional stability. The cellulosic material is first dried to the desired moisture content and is then treated with a solution of butylene oxide and a tertiary amine. The treating solution is then heated and subjected to pressure. The temperature and pressure is maintained for a period of time, the solution is drained and vacuum is applied, or other suitable steps are taken, to remove remaining excess reagent.

The primary object of this invention is a process which will increase rot resistance of cellulosic materials while improving dimensional stability. A second object is to develop a process which does away with much of the expensive pressure-tight equipment necessary with some processes in the prior art. Another object is a process which will produce stable ether bonds between the wood components and the epoxides. Yet another object is a process which will bring about formation of a polymer matrix in the cell wall that will give water repellancy. Other objects and advantages will become apparent hereinafter from the description and drawing.

BRIEF DESCRIPTION OF THE DRAWING

The drawing is a schematic view of a typical procedure for processing material according to the invention.

DESCRIPTION OF THE PREFERRED EMBODIMENTS

Referring to the drawing, the wood is predried to the desired moisture content at 1. This could be by oven or solvent drying with the desired moisture content generally being between 0 and 7 percent. These and other drying methods are disclosed by Hudson, Amer. Wood Preservers' Assoc. Proc. 4:209–243 (1950). The dried wood is introduced into the treating chamber 2 which contains treating solution. This solution is a mixture of butylene oxide from container 3 and a tertiary amine, preferably triethylamine due to its suitable boiling point, from container 4. The ratio will vary between 1 and 50 percent catalyst with most successful results reached in the 5 to 10 percent range. With the exception of the treating chamber itself, these vessels and piping do not have to be pressure tight if triethylamine is used because both reagents would be liquids at room temperatures. The treating solution is then heated, preferably to 90° to 120° C., and is subjected to between 110 and 150 p.s.i. pressure. The temperature and pressure is maintained for a period of time, preferably 1 to 4 hours, the standing solution is drained through line 5, and any remaining excess reagent is removed from the wood.

This final step of removing remaining excess reagent may be performed by several methods:

1. Vacuum treatment (with pump 6) at a temperature equal to or greater than that of the reagent with the highest boiling point (usually this will be triethylamine with a b.p. of 90° C. at atmospheric pressure).
2. Vacuum treatment at below the b.p. This procedure is obviously more time consuming than the first method.
3. Solvent extraction procedure (hot or cold) using, for example, xylene. This is a relatively expensive method in terms of energy consumption but is very fast and has been shown to be very successful with green wood.
4. Heat to b.p. of highest reagent.
5. Air curing (shown schematically at 7).
6. Combinations of the above.

The following examples are presented as further illustrative of the invention.

EXAMPLE I

Wood samples of Southern Yellow Pine ¾ × ¾ × 6 inches were oven dried to 3 percent moisture content. The samples were then submerged in a reaction cylinder containing a solution of butylene oxide/triethylamine in a ratio of 95/5 (v/v). The cylinder was closed and heated for 90 minutes at 120° C. and 150 p.s.i. After reaction, the excess reagent was drained and 18 inches of vacuum was applied for 30 minutes. The samples were oven dried for 4 hours at 105° C. and then air dried for 24 hours.

The treatment of Example I results in 25 percent weight add-on. The properties of a treated sample are compared with those of a sample treated with propylene oxide and with a control in Table 1.

TABLE 1

| | | | Innoculated with *lenzites trabea* | | | |
| | | | Nonleached | | Leached | |
| | Wt. % | | % wt. loss after | | | |
| | gain | A.S.E.* | 6 weeks | 12 weeks | 6 weeks | 12 weeks |
|---|---|---|---|---|---|---|
| Control | 0 | — | 44.6 | 62.9 | 44.9 | 68.7 |
| Propylene Oxide | 25 | 61 | 9.5 | 34.7 | 16.0 | 50.9 |
| Butylene Oxide | 25 | 73 | 3.3 | 3.3 | 2.9 | 1.7 |

*of treated piece over untreated control

EXAMPLE II

Wood samples of Southern Yellow Pine, ¾ × ¾ × 6 inches were solvent dried with xylene to 2 percent moisture content. The samples were then submerged in a reaction cylinder containing a solution of butylene oxide/triethylamine in a ratio of 95/5 (v/v). The cylinder was closed and heated for 60 minutes at 120° C. and 150 p.s.i. After reaction, the excess reagent was drained and the sample was vapor dried with xylene for 2 hours and given a final vacuum treatment at 144° C. for 30 minutes at 18 inches vacuum.

The treatment of Example II results in a 14 percent weight add-on. The properties of the resultant samples are shown in Table 2.

TABLE 2

| | | | Innoculated with *Lenzites trabea* | | | |
| | | | Nonleached | | Leached | |
| | Wt. % | | % wt. loss after | | | |
| | gain | A.S.E. | 6 weeks | 12 weeks | 6 weeks | 12 weeks |
|---|---|---|---|---|---|---|
| Control | 0 | — | 44.6 | 62.9 | 44.9 | 68.7 |
| Propylene Oxide | 14 | 12 | 12.4 | 41.4 | Not observed | |
| Butylene Oxide | 14 | 53 | 2.9 | 12.4 | 1.8 | 11.9 |

It will thus be seen that the objects of the invention are fully accomplished in that there is provided a process which will increase rot resistance while improving dimensional stability. A mild reaction medium is involved so there is little wood degradation. Very stable ether bonds are formed between the wood components and the chemical. The excess chemicals that remain after drainage are easily removed from the wood due to their relatively low boiling points. There are no reagent byproducts that must be removed after the application of the vacuum or whatever other final step is taken to remove remaining excess reagents. In addition to this, the polymer matrix formed in the cell wall gives water repellancy to the cellulosic material. Finally, it has been determined that the present process increases the treated material's resistance to attack by insects such as termites.

Having thus disclosed the invention, we claim:

1. A process of treating cellulosic materials comprising:
   a. drying the cellulosic materials to be treated;
   b. treating the dried cellulosic material with a solution of butylene oxide and a tertiary amine under elevated temperature and pressure, said butylene oxide and said tertiary amine being present in amounts sufficient to impart increased rot resistance and improved dimensional stability to said dried cellulosic material;
   c. draining the standing reagent; and
   d. removing the remaining excess reagent.

2. The process of claim 1 wherein step a. dries the material to a moisture content of 0 to 7 percent.

3. The process of claim 1 wherein the tertiary amine is triethylamine.

4. The process of claim 1 wherein the solution has between 1 and 50 percent amine.

5. The process of claim 1 wherein the solution has between 5 and 10 percent amine.

6. The process of claim 1 wherein the elevated temperature is between 90° and 120° C.

7. The process of claim 1 wherein the elevated pressure is between 110 and 150 p.s.i.

8. The process of claim 1 wherein step (d) comprises vacuum treatment at temperatures equal to or greater than the boiling point of the reagent with the highest b.p.

9. The process of claim 1 wherein step (d) comprises a solvent extraction procedure.

10. The process of claim 1 wherein step (d) comprises heating to the boiling point of the reagent with the highest boiling point.

* * * * *